US006969546B2

(12) United States Patent
DiChiara, Jr.

(10) Patent No.: US 6,969,546 B2
(45) Date of Patent: Nov. 29, 2005

(54) THERMAL INSULATION SYSTEM EMPLOYING OXIDE CERAMIC MATRIX COMPOSITES

(75) Inventor: Robert A. DiChiara, Jr., Carlsbad, CA (US)

(73) Assignee: The Boeing Company, Chicago, IL (US)

( * ) Notice: Subject to any disclaimer, the term of this patent is extended or adjusted under 35 U.S.C. 154(b) by 108 days.

(21) Appl. No.: 10/689,809

(22) Filed: Oct. 20, 2003

(65) Prior Publication Data

US 2005/0084665 A1 Apr. 21, 2005

(51) Int. Cl.[7] ............................ B32B 3/14; B32B 3/18; B05D 1/12; B05D 3/02

(52) U.S. Cl. ............................ 428/49; 428/46; 428/76; 428/121; 428/293.4; 428/375; 428/378; 428/701; 428/702; 428/428; 428/697; 428/699; 427/180; 427/181; 427/202; 427/203; 427/205; 427/206; 427/314; 427/376.3; 427/376.2; 442/178; 244/158 A; 501/35; 501/53; 501/133

(58) Field of Search ............................ 428/46, 49, 76, 428/121, 293.4, 375, 378, 701–702, 428, 697, 699; 427/180–181, 202–203, 205, 206, 314, 376.3, 376.2; 442/178; 244/158 A; 501/35, 53, 133

(56) References Cited

U.S. PATENT DOCUMENTS

| | | | | |
|---|---|---|---|---|
| 5,626,951 A | | 5/1997 | Hogenson | |
| 5,702,761 A | | 12/1997 | DiChiara, Jr. et al. | |
| 5,928,775 A | | 7/1999 | DiChiara, Jr. et al. | |
| 6,489,001 B1 | * | 12/2002 | Cazzato et al. | 428/45 |
| 2002/0197465 A1 | * | 12/2002 | Butner et al. | 428/293.4 |
| 2003/0022783 A1 | | 1/2003 | DiChiara, Jr. | |
| 2003/0032545 A1 | | 2/2003 | DiChiara, Jr. | |
| 2004/0110041 A1 | * | 6/2004 | Merrill et al. | 428/699 |

* cited by examiner

*Primary Examiner*—Ling Xu
(74) *Attorney, Agent, or Firm*—Ingrassia Fisher & Lorenz, P.C.

(57) ABSTRACT

A ceramic tile includes a ceramic core material and an oxide ceramic matrix composite (CMC), where the ceramic core material has at least one surface covered by the oxide CMC. The oxide CMC includes a ceramic fiber, with a cured metal oxide ceramic material impregnating the ceramic fiber. An exemplary embodiment of the ceramic tile provided as part of the invention further includes a tough low temperature cure coating (TLTC) which infiltrates the ceramic core surface before it is covered by the oxide CMC. The TLTC includes a cured ceramic powder together with a binder. The metal oxide ceramic material impregnating the ceramic fiber, and the TLTC are co-cured, meaning that neither is cured when the CMC is wrapped around a surface of the TLTC-infiltrated ceramic core, and a curing step is performed on both uncured ceramic materials at the same time.

34 Claims, 3 Drawing Sheets

THERMAL INSULATION SYSTEM EMPLOYING OXIDE CERAMIC MATRIX COMPOSITES

TECHNICAL FIELD

The present invention generally relates to insulation material, and more particularly relates to thermal insulation tiles for launch vehicles.

BACKGROUND

Ceramic tiles have long been the standard insulation to protect heat vulnerable regions of a launch vehicle such as a Space Shuttle. Tiles are commonly made using materials such as those commonly referred to as LI900 or LI2200 (Lockheed® Insulation at 9 lb/ft$^3$ and 22 lb/ft$^3$ density), FRCI (Fiber Reinforced Ceramic Insulation), AETB (Alumina Enhanced Thermal Barrier), and BRI (Boeing® Rigid Insulation) used for thermal protection systems on orbiting vehicles. In the past, the size of the tiles was typically about 6" by 6" and typically had an outer surface protection layer that included reaction cured glass (RCG). Subsequently, a coating commonly referred to as Toughened Unified Fibrous Insulation (TUFI) and similar coatings were developed and used in place of or in combination with RCG.

Newer developmental programs for launch vehicles, aircraft engines and other engines, and other extreme environments require much larger insulation pieces in order to achieve the advantages of fewer gaps and joints between the insulation pieces. The developmental programs also require smoother and more durable surfaces from insulation pieces, and in some cases require low dielectric constant surfaces. It remains important for the insulation pieces to withstand temperatures greater than 1500° F. for 100 hours or more.

Accordingly, it is desirable to provide an insulation tile that has a smooth outer surface, can be manufactured in large or small pieces of various shapes and sizes, and can withstand high temperatures for extended periods. In addition, it is desirable to provide a method for the manufacture and use of a suitable tile. Furthermore, other desirable features and characteristics of the present invention will become apparent from the subsequent detailed description and the appended claims, taken in conjunction with the accompanying drawings and the foregoing technical field and background.

BRIEF SUMMARY

A ceramic tile is provided as an insulating apparatus. The ceramic tile includes a ceramic core material and an oxide ceramic matrix composite (CMC), where the ceramic core material has at least one surface covered by the oxide CMC. The oxide CMC includes a ceramic fiber, with a cured metal oxide ceramic material impregnating the ceramic fiber. An exemplary embodiment of the ceramic tile provided as part of the invention further includes a tough low temperature cure (TLTC) coating that infiltrates the ceramic core surface before it is wrapped or otherwise covered by the oxide CMC. The TLTC includes a cured ceramic powder together with a binder.

A method is also provided for forming a ceramic tile. The method includes the step of covering a surface of a ceramic fiber core insulating material with an oxide CMC where again, the oxide CMC includes a ceramic fiber fabric, and a cured metal oxide ceramic material impregnating the fabric. An exemplary method further includes the step of infiltrating the surface of the ceramic fiber insulation core material with TLTC before covering the surface with the oxide CMC where again, the TLTC includes a ceramic powder together with a binder. The metal oxide ceramic material impregnating the ceramic fiber fabric, and the TLTC are co-cured, meaning that neither is cured when the CMC is wrapped around a surface of the TLTC-infiltrated ceramic fiber insulating core, and a curing step is performed on both uncured ceramic materials at the same time. Alternatively, the TLTC is cured first and the oxide CMC is wrapped around the TLTC coated tile then cured and fired.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
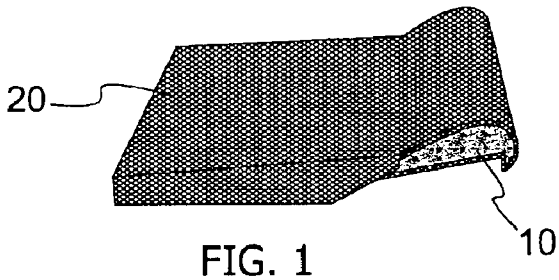
FIG. 1 shows an oxide CMC coated AETB type tile according to one embodiment of the present invention.

In order to provide an insulation tile that has a smooth outer surface, can be manufactured in large or small pieces of various shapes and sizes, and can withstand high temperatures for extended periods, the present inventors created an oxide CMC coated AETB type tile. FIG. 1 shows an exemplary tile 100 for a payload door hinge cover according to the present invention. The tile core 10 is an insulation material such as AETB, and is machined in advance to a predetermined shape. An oxide CMC prepreg is wrapped around the insulation to form an oxide CMC coating 20. The oxide CMC coating 20 can be disposed only on the outermost surface of the tile core 10 to provide wear protection, impact damage resistance and smoothness, or it can be disposed on all sides to make a very stiff insulation sandwich structure.

The CMC coating 20 is usually applied after the tile cores are bonded together, producing a smooth outer surface and supporting the bond joint. Consequently, only the non-bonded surfaces are typically covered with the CMC coating 20. As an alternative to applying the oxide CMC coating 20 after bonding the tile cores together, the oxide CMC coating 20 can be applied to selected sides of the tile core 10, leaving some parts of the tile core 10 bare for the purpose of joining the tile 100 with bare sections of other tiles. An organic composite (not shown) can also be applied to the bare areas of the core 10 to provide additional insulation and strength after bonding. The organic composite can be selected from many known compounds including but not limited to various epoxies and such known compounds as carbon/bismaleimide epoxies, and carbon/crosslinked polyimides (e.g., PMR-15, AFR700B).

Although not shown in FIG. 1, a pre-coating of TLTC is preferably applied to the outer surface of the tile core 10 and, by penetrating the surface prevents the oxide CMC from infiltrating the tile core 10, improves the CMC adhesion, and improves the systems damage resistance. As will be discussed in detail below, in an exemplary embodiment of the invention, the TLTC and the oxide CMC are co-cured at a relatively low temperature. After the oxide CMC is cured, the entire tile 100 may be fired at a high temperature as a post cure process. The TLTC pre-coating adds between 0.2 and 2 $g/in^2$, and typically about 1 $g/in^2$.

Beginning with the outer oxide CMC coating 20, each of the elements of the tile 100 shown in FIG. 1 or any other tile prepared according to the principles of the present invention will presently be discussed.

CMCs are well suited to high temperature structural environments for aerospace and industrial applications. Advanced structural ceramics are materials that have relatively high mechanical strength at high temperatures. These materials are durable under a number of physically demanding conditions such as high temperature, corrosive conditions, and high acoustic environments.

A subcategory of CMCs is the oxide based ceramic matrix composite (oxide CMC). Oxide CMCs are economic, low dielectric, thermally stable, structural ceramic systems stable to at least 2300° F. The matrix is reinforced with a variety of fibers such as quartz fiber composites, fibers produced under the 3M trade-names Nextel® 312, Nextel® 550, Nextel® 619, Nextel® 650, Nextel® 720, and others. The fibers may be provided in the form of a tape or a ceramic fabric such as 4, 5, 8 harness satin fabric, plan weave fabric, crawfoot satin fabric, and braided fabric. The fibers are chosen for their strength, maximum temperature capability, dielectric properties and their thermal expansion match to the given ceramic insulation.

The primary advantage of oxide CMCs over carbon-carbon and other high temperature composites include low cost, absence of a need for oxidation protection coatings or inhibitors, and ability to make near net-shape components quickly. Metal oxides that are commonly combined with the ceramic fabric or tape to produce an oxide composite structure include alumina ($Al_2O_3$), silica ($SiO_2$), cordierite ($MgAlSiO_3$), mullite ($Al_6Si_2O_{13}$), zirconia ($ZrO_2$), and many others. U.S. application Ser. No. 09/918,158 (Published as US 2003/0022783) teaches various oxide CMC formulations, including those that exhibit a sol gel matrix with mixed or blended metal oxide particles, and is hereby expressly incorporated by reference. Another method of formulating oxide CMCs is to combine metal oxide(s) with organic resins such as acrylic epoxy-type resins to form an oxide composite structure. A major consideration when choosing an appropriate ceramic matrix and/or reinforcement fiber is that they have a coefficient of thermal expansion that closely matches the coefficient of thermal expansion for the insulation material over which the oxide CMC is wrapped.

The ceramic fiber insulation tile core 10 of the present invention can be virtually any rigid insulation billet tile. Fibrous type insulation tile is often found in the furnace insulation industry as well as the aerospace industry. As it is ideal to have a light-weight tile, rigid fiber insulation is an exemplary type of tile for the present invention. AETB insulation and BRI are standard high temperature materials for thermal protection systems on spacecraft such as the Space Shuttle, and is an exemplary material for use in the present invention. A number of techniques are known for preparing such a material. Preferably, the tile core 10 is made of a ceramic material by forming a mat of ceramic fibers and then sintering the mat to leave porosity between the fibers. In one known approach, silica fibers, aluminoborosilicate fibers, and alumina fibers are placed into a mold. A vacuum is drawn on one side of the mold to collapse the fibers into a mat, possibly with other additives captured inside the mat. The mat is heated to a temperature of about 2500° F. to sinter the fibers into the solid ceramic material having porosity therein. The extent and nature of the porosity can be controlled by the manufacturing technique. Other typical approaches for forming the ceramic insulation material include bonding the various types fiber with glass forming ceramic particulates or sol gel binders.

Figure 2:
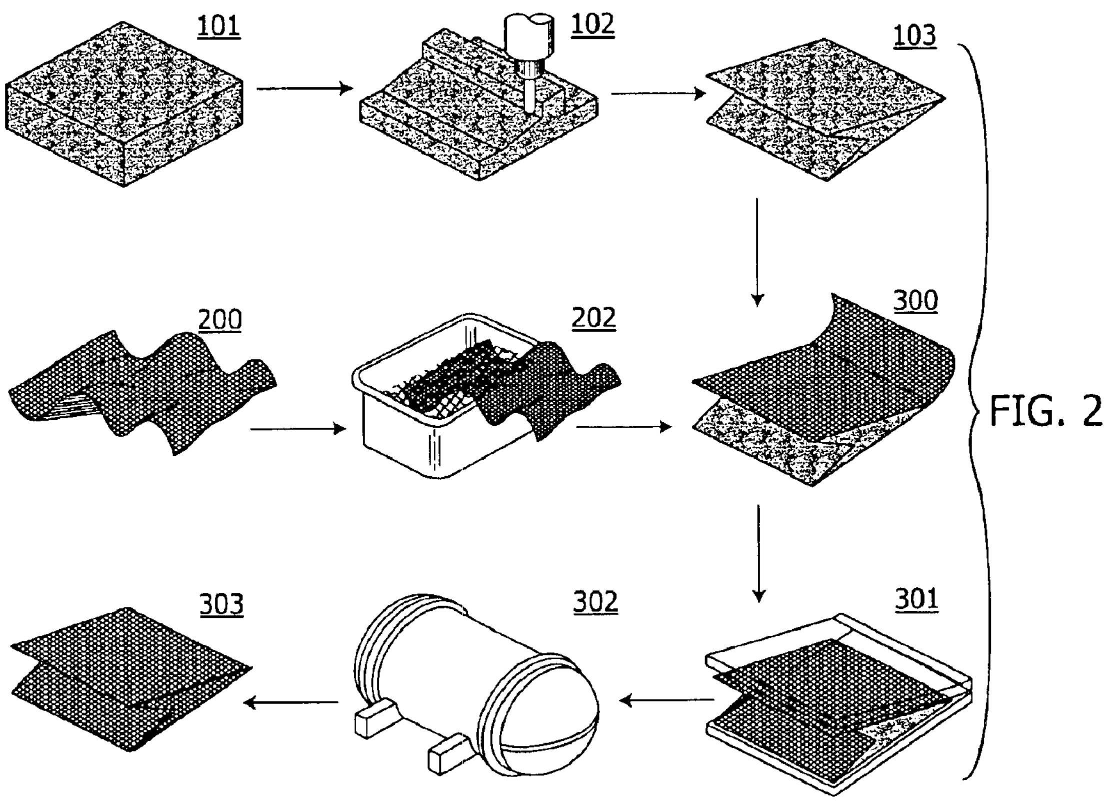
FIG. 2 shows a schematic of steps in a first manufacturing process for forming an oxide CMC coated AETB type tile according to the present invention.

A first embodiment for a method of manufacturing a thermal insulation system employing oxide CMCs will now be discussed, with reference being made to FIG. 2. Shown as step 101, a tile core billet is provided, with any preparatory steps such as firing already performed. As mentioned above, the billet should be formed from a high temperature insulation material. An exemplary material for the tile core is rigid fiber insulation such as AETB or BRI, although there are many rigid insulation materials, which can form the tile core.

Next, shown as step 102, the tile core billet is machined to any shape that may be required. An advantage of the present invention is that the billets may be made in virtually any size or shape, as long as the surfaces that are to be coated are sufficiently exposed for oxide CMC coating. Further, the billets may be attached together to form a large billet comprising smaller billet units. U.S. Pat. No. 6,494,979 teaches procedures for bonding AETB type insulation together and is hereby incorporated by reference. For example, standard AETB billets have been made as large as 22"×22"×6.25". Under the principles of the present invention, the billets may be bonded together to form a larger billet than has previously been available for use. The additional strength provided by the oxide CMC coating allows for the use of larger smooth billets that can be formed in various shapes. Further, the larger billets are composed of several units bound together in a wrap, effectively reducing part count, assembly, steps, gaps and removing much of the maintenance that would likely be necessary for many separate billets that may become loose or deteriorated over time.

Once the tile core billet is machined on a rough scale, final details are provided to the billet through further machining. The finished core billet is shown after being detailed in step 103.

At any time before, during, or after steps 101 to 103 above are performed, an oxide CMC wet prepreg is prepared. First, a ceramic fiber fabric or tape 200 is provided. Then, a slurry composition containing particles of a binding agent, particles of a ceramic powder, and a solvent composition is provided to impregnate the ceramic fiber fabric or tape 200. Slurries of ceramic powders and binding agents in solvents are disclosed in U.S. Pat. Nos. 5,928,775 and 5,702,761, along with U.S. application Ser. No. 09/927,175 (Publication US 2003/0032545), which are all expressly incorporated herein by reference.

In an exemplary embodiment of the invention, the fiber fabric or tape is formed from fibers that are ceramic and remain physically stable when exposed to extreme temperatures, such as those experienced by a spacecraft upon launch and re-entry into the atmosphere. For use on leeward surfaces of a spacecraft, the fibers should be stable up to 1200° F., and for windward surfaces the fibers should be stable up to 2400° F. The fibers are continuous, meaning that most of the fibers span a substantial portion of either the length or width of the woven fabric. Exemplary fabrics for use with the prepreg include quartz fiber woven fabrics, mullite fabrics, and silicon carbide fabrics. Of the Nextel™ brand fabrics, Nextel™ 610 (alumina), Nextel™ 720 or 550 (mullite), and Nextel™ 312 (aluminoborosilicate) are just some that are suitable for performing the function of reinforcement of the oxide CMC, with Nextel™ 312 being preferred. The ceramic fiber cloth or tape 200 can be a single-ply or a multi-ply material, depending on the required thickness of the oxide CMC that is to be produced. Usually 2 plies of CMC are preferred with a thickness of about 0.020 inch.

The ceramic fiber is impregnated with a pre-ceramic matrix slurry, shown as step 202, to complete preparation of the oxide CMC wet prepreg. In one exemplary embodiment of the invention, a pre-ceramic slurry is formed from a water-based monazite suspension. Beta or alpha SiC, preferably beta SiC, is optionally added to the suspension as a high emissivity agent to lower the surface temperature of the prepreg when in use, by absorbing and reradiating the heat to space. The pre-ceramic slurry can be a suspension of 15 to 45 wt % solids, preferably about 30 wt %, in DI water. The solids are composed of 60 to 100 wt % monazite particulates, preferably about 90 wt % monazite particulates, and 0 to 40 wt % SiC particulates, preferably about 10 wt % SiC particulates. Other emissivity agents can readily be substituted for SiC in the formulation.

In another exemplary embodiment of the invention, the pre-ceramic matrix slurry is formed by suspending alumina silicate colloidal particles in alcohol or acetone. Other exemplary precursors include alumina, silica, mullite and cordierite. A pre-ceramic alumina silicate slurry is preferably formed from an alcohol or acetone based alumina silicate suspension. Beta or alpha SiC, preferably beta SiC, is again optionally added as a high emissivity agent. The pre-ceramic slurry is a suspension of 50 to 85 wt % solids, preferably about 68 wt %, in alcohol or acetone, and preferably alcohol. The solids are composed of 60 to 100 wt % alumina silicate particulates or pre-ceramic solutions, preferably about 90 wt % alumina silicate particulates, and 0 to 40 wt % SiC particulates, preferably about 10 wt % SiC particulates. Other emissivity agents can readily be substituted for SiC in the formulation.

In another exemplary embodiment of the invention, a pre-ceramic matrix slurry is formed by suspending alumina sol in water and mixing the suspension with submicron alumina powder. An example of a suitable commercial sol for use in this embodiment includes a compound produced by Vista Chemical Co.® (14N-4-25) containing 25% solids of colloidal alumina ($Al_2O_3$) in water which are mixed in a blender with submicron alumina powder such as that produced by Baikowski® (SM-8). The matrix contains about 57 wt. % of alumina sol and about 43 wt. % of alumina powder. This slurry is then doctor bladed into the ceramic fiber producing a ceramic prepreg to be wrapped around a tile. An alternative sol gel CMC matrix solution is an alumina-coated silica sol produced by Nalco Chemical Co.® (1056) containing 20% solids of colloidal silica ($SiO_2$) coated with alumina in water. The compounds are mixed in a blender with submicron alumina powder to provide a matrix containing about 57 wt. % of alumina-coated silica sol and 43 wt. % of alumina powder. One or more emissivity agents such as SiC, $SiB_6$, and $MoSi_2$ can be added to the slurry to raise the CMC emissivity to >0.8 before the slurry is prepregged into the fiber cloth.

A method such as ball milling, attritor milling, and high-shear mixing may be used to combine and mix the components of the above pre-ceramic slurries or equivalent slurries. Further, the slurry can infiltrate the fabric using any common infiltration method, including the use of a doctor blade or a pinched roller apparatus if necessary.

As shown as step 300, the oxide CMC wet prepreg is wrapped on top of the machined fiber insulation tile core. An important benefit of using the oxide CMC wet prepreg to wrap the fiber insulation core lies in the lack of tooling necessary to form a wrapped assembly of virtually any shape. The oxide CMC prepreg has sufficient tack to be draped onto or wrapped around a tile of virtually any shape without the need for a molding apparatus, securing parts or assemblies, or the use of multiple parts to keep the wrapped tile intact. In fact, the entire oxide CMC prepreg can be wrapped by hand and the wrapped fiber insulation tile core will maintain its intended shape. However, in the event that the tile is apt to lose its form over time due to stress or a smoother tool surface is required, the wrapped assembly can optionally be held in a lay-up tool for any necessary period of time, as shown in step 301.

The wrapped insulation core is placed into a vacuum bag and heated in order to compact and cure the CMC skin to the ceramic insulation tile. The heating and curing is designated as step 302, and if a denser CMC outer surface is preferred an autoclave or a press such as a uniaxial or hydrostatic press, with the preferred method incorporating the autoclave. In an exemplary embodiment of the invention, an autoclave is used for curing between about 25 and about 200 psi, preferably between about 50 and about 80 psi, and at a temperature ranging from ambient (room) temperature to about 500° F., preferably 350° F.

Once the cured article is substantially rigid it may be subjected to a post cure. The post cure can be performed to the cured article in a free-standing disposition. The post cure process includes firing the cured article at temperatures ranging between about 1000° F. and about 2000° F., preferably about 1500° F., for approximately two hours for oxide CMC with Nextel 312™ fabric.

Figure 3:
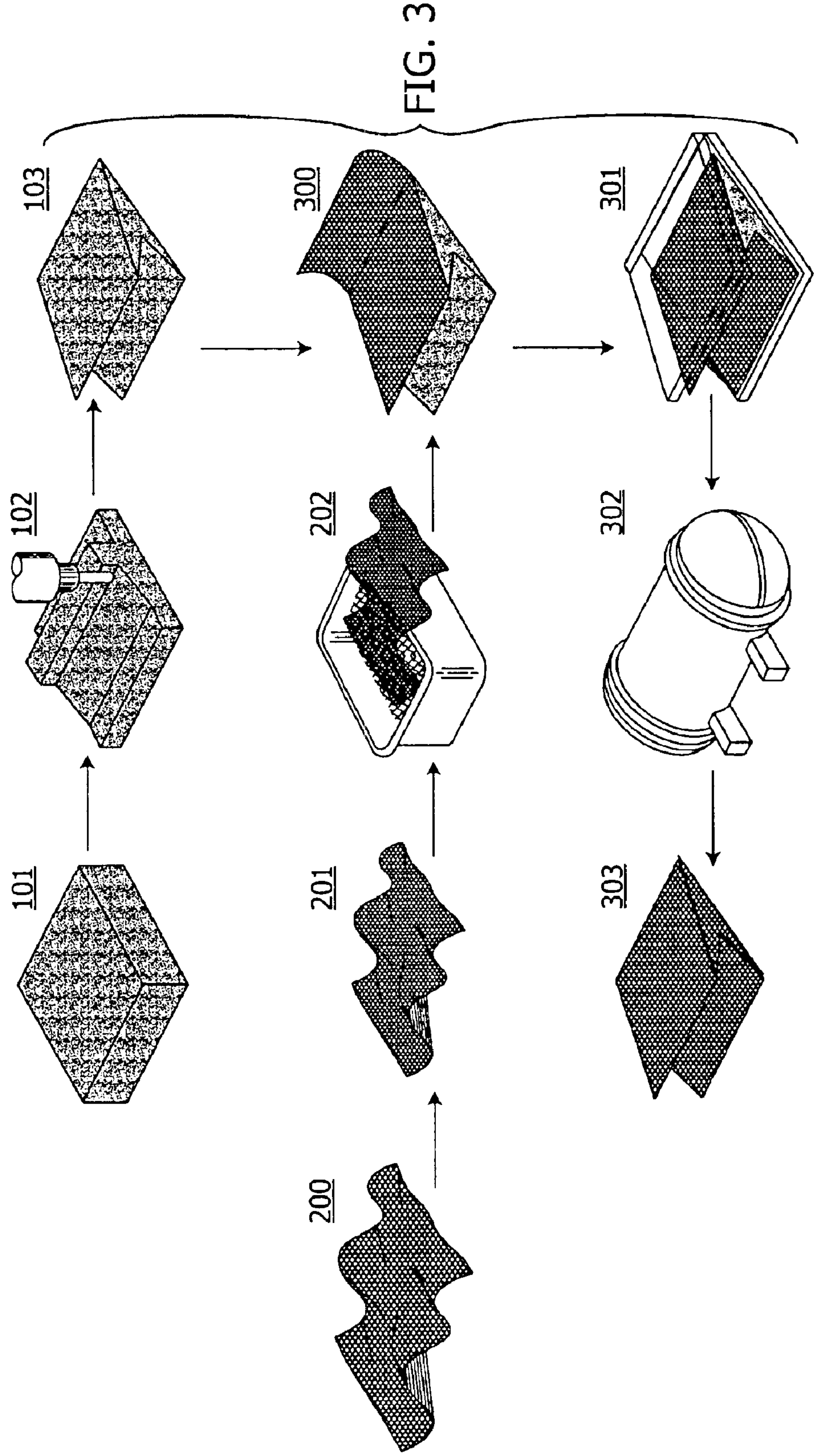
FIG. 3 shows a schematic of steps in a second manufacturing process for forming an oxide CMC coated AETB type tile according to the present invention.

As mentioned above, a major consideration when choosing an appropriate ceramic matrix and/or reinforcement fiber is that they have a coefficient of thermal expansion that closely matches the coefficient of thermal expansion for the insulation material over which the oxide CMC is wrapped. If one of these components expands or shrinks too extensively during cure, or post cure, the cured article may crack during use. The article may crack in its entirety, although it is most common for the ceramic fiber insulation to crack due to CTE mismatch or shrinkage of the reinforcement fiber. The Nextel 312™ CMC wrapped tile has an excellent thermal expansion match to BRI fiber insulation tile and can be used to 1500° F. extensively. Exposure to 1800° F. may cause the Nextel 312™ aluminum borosilicate fiber to shrink and crack the tile. By aging the woven fiber at 1800° F. before the matrix is prepregged into the fiber the fiber can be preshrunk. The woven preshrunk fiber is prepregged and after cure and firing the Nextel 312™ CMC wrapped tile can be exposed to temperatures as high as 1800° F. without cracking the BRI ceramic fiber insulation. The shrinking step is shown on FIG. 3 as step 201.

Figure 4:
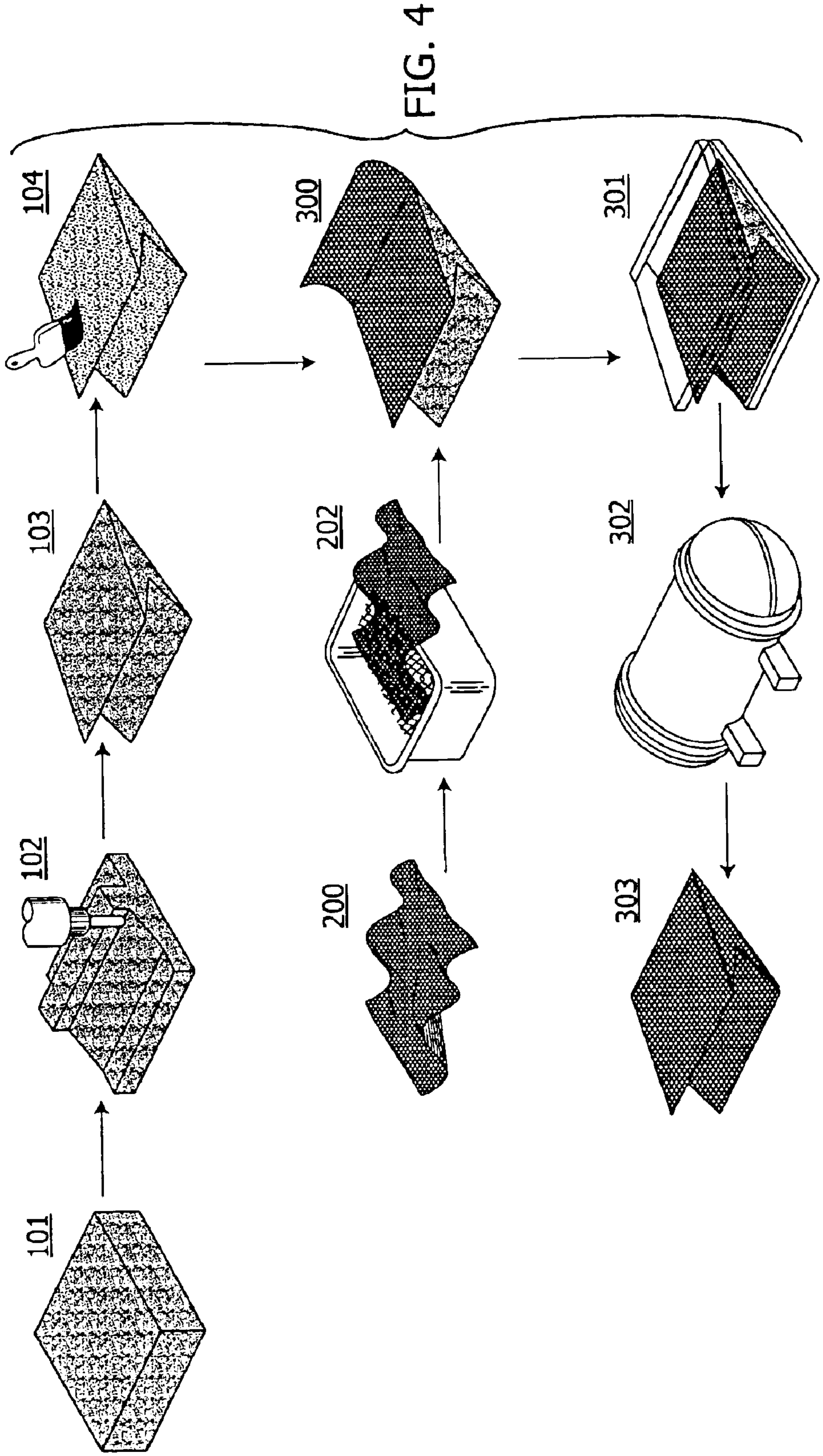
FIG. 4 shows a schematic of steps in a third manufacturing process for forming an oxide CMC coated AETB type tile according to the present invention.

An exemplary embodiment of the method of the present invention includes the application of a TLTC coating to the outer surface of the ceramic tile billet. This step is shown in FIG. 4 as step 104. A slurry is prepared by first mixing a silica sol solution and a fine ceramic powder. The silica sol binding agent comprising small silica particles in the size range of from about 4 to about 150 nm. The silica particles are mixed with a carrier liquid, such as water with a small amount of ammonia present. The silica particles are typically present in an amount of from about 15 to about 50 parts by weight of the mixture of silica and liquid, producing a silica sol mixture having a viscosity comparable with that of water. An operable silica sol of this type is available commercially. Other known binders can also used, in place of or together with silica sol. For example, alumina-coated silica sols and alumina sols are also available and can be used in accordance with the above slurry formation method. Added into the silica sol is a ceramic powder that is typically composed of a material having an average particle size no greater than about 2 $\mu$m. The small particle size permits the TLTC slurry to penetrate into the porosity of the ceramic tile core surface shown in step 103 during subsequent processing. The ceramic powder that makes up part of the slurry may be any operable material, but in an exemplary embodiment of the invention has a cordierite ($MgAlSiO_3$) composition. Other ceramics such as silica, mullite and zirconia can be used.

Appropriate amounts of the ceramic powder and the binder are mixed together to form TLTC. In an exemplary method, from about 23 to about 29 parts by weight of cordierite powder and from about 71 to about 77 parts by weight of silica sol are mixed together. The mixture is mixed using, for example, a propeller mixer and then ball milled to form a uniform mixture in the form of a slurry having a consistency comparable to that of water.

The resulting TLTC slurry, having a consistency similar to that of water, is easily applied to the ceramic tile core billet as shown in step 104 to infiltrate the slurry into the porosity of the billet. The application is performed using mechanical contact pressure, i.e. by use of a brush or a squeegee in order to force the slurry into the pores, but may also be performed by non-contact techniques such as spraying. The amount of the slurry introduced into the porosity of the ceramic tile core billet is a function of the amount that is applied to the surface. In an exemplary embodiment of the invention, the amount of slurry added to the billet causes the weight of the billet to increase from about 1.0 to about 6.0 grams per square inch of treated surface area, and most preferably about 2 $g/in^2$ of surface area prior to curing, which reduces to 1 $g/in^2$ on the final cured part.

However, an important feature of this exemplary embodiment of the invention involves wrapping the slurry-infiltrated ceramic tile core billet with the oxide CMC with both the TLTC billet-infiltrating slurry and the oxide CMC in step 302. The TLTC slurry that infiltrates the surface of the ceramic tile core billet prevents the oxide CMC from infiltrating the tile core. The TLTC coating makes the insulation denser, tougher, and raises its coefficient of thermal expansion as well.

The oxide CMC tile prepared according to the various embodiments described above includes many benefits that have never been heretofore accomplished. The tiles have a durable, high temperature composite outer surface layer, the manufacture of which allows for large parts to be fabricated from smaller parts, with the oxide CMC covering the seams where core tile billets are bonded together. The Nextel 312™ oxide CMC tile has a low dielectric constant of approximately 3.5.

Also, the durable outer surface layer provided by the oxide CMC reduces operational damage to the tile, and can be easily manufactured in a variety of shapes and sizes without the need for tooling. Further, the oxide CMC can be applied to the tile in various single or multiple layers across the tile, which may assist in forming, for example, cantilevered areas or other areas that must vary in thickness.

When CMC is placed on both sides of the ceramic tile core billet, the parts become very stiff sandwich panels which are very efficient in their structural design and are also very efficient thermal insulators. Further, an erosion test was performed on an oxide CMC coated AETB tile prepared according to the process of FIG. 4, where the TLTC coating was formed from a slurry of cordierite and silica sol. The finished tile was wrapped in its entirety with two ply Nextel 312 oxide CMC. The finished tile had a density of 16 $lb/ft^3$, which is considerably less dense than conventional RCG/TUFI coated tile insulation. The tile of the present invention and the conventional RCG/TUFI coated tile insulation were first exposed to 1400° F. for 12 hours. Then, the surfaces were bombarded with 300 grams of glass particles (0.005" diameter). The glass particles were aimed at the tiles at a 90° angle relative to the tile surfaces, and had a velocity of 280 ft/sec. Despite the much smaller density of the oxide CMC coated tile of the present invention, little to no erosion of the tile was observed. In contrast, the conventional dense RCG/TUFI coated tile insulation was severely eroded following the bombardment, with deep indentations where glass had bombarded the tile surface.

A rain erosion test was also performed on the same tile of the present invention and the conventional RCG/TUFI coated tile, where each tile was subjected to equal amounts of rain water. The oxide CMC tile of the present invention showed double the improvement in comparison with the conventional RCG/TUFI coated tile.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A ceramic tile, which comprises:

a ceramic core material; having a surface; a tough low temperature cure coating (TLTC) infiltrating the surface, the TLTC comprising a cured ceramic powder combined with a binder; and an oxide ceramic matrix composite (CMC), covering the surface infiltrated with the TLTC, the oxide CMC comprising:

a ceramic fiber; and a cured metal oxide ceramic material impregnating said ceramic fiber.

2. A ceramic tile according to claim 1, wherein said cured metal oxide ceramic material impregnating said ceramic fiber and said TLTC are co-cured.

3. A ceramic tile according to claim 1, wherein said ceramic core material has a coefficient of thermal expansion, and said TLTC raises said coefficient of thermal expansion of said ceramic core material.

4. A ceramic tile according to claim 1, wherein said ceramic powder comprises cordierite.

5. A ceramic tile according to claim 1, wherein said binder comprises silica sol.

6. A ceramic tile according to claim 1, wherein said TLTC infiltrates every surface of said ceramic core material, and said oxide CMC entirely surrounds said ceramic core material.

7. A ceramic tile according to claim 1, wherein substantially none of said TLTC lies on said surface of said ceramic core material.

8. A ceramic tile according to claim 1, wherein said TLTC further comprises an emissivity-modifying agent that modifies the emissivity of a region of said ceramic core material surrounding said surface.

9. A ceramic tile according to claim 1, wherein said oxide CMC entirely surrounds said ceramic core material.

10. A ceramic tile according to claim 1, wherein said ceramic core material comprises a sintered mat pf ceramic fibers.

11. A ceramic tile according to claim 9, wherein said ceramic fibers comprise silica fibers, aluminoborosilicate fibers, and alumina fibers.

12. A method of forming a ceramic tile, which comprises the steps of:

infiltrating a surface of a ceramic core material with a tough low temperature cure coating (TLTC) comprising a cured ceramic powder combined with a binder; and covering the TLTC-infiltrated surface of the ceramic core material with an oxide ceramic matrix composite (CMC), said oxide CMC comprising:

a ceramic fiber, and a cured metal oxide ceramic material impregnating said ceramic fiber.

13. A method according to claim 12, which further comprises the step of:

pre-shrinking said ceramic fiber prior to impregnating said ceramic fiber with said metal oxide ceramic material.

14. A method according to claim 13, wherein said pre-shrinking step comprises heating said ceramic fiber.

15. A method according to claim 14, wherein said ceramic fiber is heated to about 1800° F. during said pre-shrinking step.

16. A method according to claim 12, which further comprises the step of:

co-curing said cured metal oxide ceramic material impregnating said ceramic fiber and said TLTC.

17. A method according to claim 16, wherein no curing process has been performed for either said cured metal oxide ceramic material impregnating said ceramic fiber or said TLTC prior to said co-curing step.

18. A method according to claim 16, wherein said co-curing step is performed using an autoclave between about 25 and about 100 psi.

19. A method according to claim 18, wherein said co-curing step is performed between about 50 and about 80 psi.

20. A method according to claim 18, wherein said co-curing step is performed at a temperature ranging between ambient temperature and about 500° F.

21. A method according to claim 12, wherein said ceramic core material has a coefficient of thermal expansion, and said TLTC raises said coefficient of thermal expansion of said ceramic core material.

22. A method according to claim 12, wherein said ceramic powder comprises cordierite.

23. A method according to claim 12, wherein said binder comprises silica sol.

24. A method according to claim 12, wherein said infiltrating step comprises infiltrating every surface of said ceramic core material, and said covering step comprises entirely surrounding said ceramic core material.

25. A method according to claim 12, wherein upon completion of said infiltrating step substantially none of said TLTC lies on said surface of said ceramic core material.

26. A method according to claim 12, wherein said TLTC further comprises an emissivity-modifying agent that modifies the emissivity of a region of said ceramic core material surrounding said surface.

27. A method according to claim 12, wherein said covering step comprises entirely surrounding said ceramic core material.

28. A method according to claim 12, wherein said ceramic core material comprises a sintered mat of ceramic fibers.

29. A method according to claim 28, wherein said ceramic fibers comprise silica fibers, aluminoborosilicate fibers, and alumina fibers.

30. A ceramic tile produced by a method which comprises the steps of:

infiltrating a surface of a ceramic core material with a tough low temperature cure coating (TLTC) comprising a cured ceramic powder combined with a binder; and covering the TLTC-infiltrated surface of the ceramic core material with an oxide ceramic matrix composite (CMC), said oxide CMC comprising:

a ceramic fiber, and a cured metal oxide ceramic material impregnating said ceramic fiber.

31. A ceramic tile according to claim 30, wherein said method further comprises the step of:

co-curing said cured metal oxide ceramic material impregnating said ceramic fiber and said TLTC.

32. A ceramic tile according to claim 30, wherein said method further comprises the step of:

pre-shrinking said ceramic fiber prior to impregnating said ceramic fiber with said metal oxide ceramic material.

33. A ceramic tile according to claim 32, wherein said pre-shrinking step comprises heating said ceramic fiber.

34. A method according to claim 33, wherein said ceramic fiber is heated to about 1800° F. during said pre-shrinking step.

* * * * *